(12) United States Patent
Jensen et al.

(10) Patent No.: US 10,467,196 B2
(45) Date of Patent: Nov. 5, 2019

(54) PREVENTION OF DISC FRAGMENTATION

(71) Applicant: Napatech A/S, Søborg (DK)

(72) Inventors: Hans-Martin Brændmose Jensen, Rosklide (DK); Michael Milde Lilja, Virum (DK)

(73) Assignee: Napatech A/S, Søborg (DK)

( * ) Notice: Subject to any disclaimer, the term of this patent is extended or adjusted under 35 U.S.C. 154(b) by 345 days.

(21) Appl. No.: 15/281,208

(22) Filed: Sep. 30, 2016

(65) Prior Publication Data
US 2018/0095981 A1    Apr. 5, 2018

(51) Int. Cl.
*G06F 7/00*   (2006.01)
*G06F 16/17*  (2019.01)

(52) U.S. Cl.
CPC ................ *G06F 16/1724* (2019.01)

(58) Field of Classification Search
CPC .......... G06F 17/3091; G06F 17/30221; G06F 17/30067; G06F 17/30159; G06F 17/30073; G06F 17/30227; G06F 16/113; G06F 16/1865; G06F 16/1724; G06F 16/178; G06F 16/188
See application file for complete search history.

(56) References Cited

U.S. PATENT DOCUMENTS

| | | | | |
|---|---|---|---|---|
| 5,832,522 A * | 11/1998 | Blickenstaff | ............ | G06F 3/0617 |
| 6,263,338 B1 * | 7/2001 | Ronstrom | ......... | G06F 17/30368 |
| 6,748,504 B2 * | 6/2004 | Sawdon | ............. | G06F 11/1435 |
| | | | | 707/999.202 |
| 6,985,995 B2 * | 1/2006 | Holland | ............. | G06F 11/1076 |
| | | | | 707/999.202 |
| 7,739,315 B2 * | 6/2010 | Haga | .................... | G06F 3/1205 |
| | | | | 707/812 |
| 8,239,706 B1 * | 8/2012 | Yang | ................... | G06F 11/1076 |
| | | | | 714/15 |
| 2003/0159007 A1 * | 8/2003 | Sawdon | ............. | G06F 11/1435 |
| | | | | 711/154 |
| 2003/0188097 A1 * | 10/2003 | Holland | ............. | G06F 11/1076 |
| | | | | 711/114 |
| 2005/0108296 A1 * | 5/2005 | Nakamura | ......... | G06F 16/1724 |
| 2006/0117136 A1 * | 6/2006 | Tran | ..................... | G06F 3/0623 |
| | | | | 711/112 |
| 2006/0117153 A1 * | 6/2006 | Tran | ..................... | G06F 3/0623 |
| | | | | 711/159 |
| 2007/0208915 A1 * | 9/2007 | Tran | ..................... | G06F 3/0623 |
| | | | | 711/159 |

* cited by examiner

*Primary Examiner* — Daniel A Kuddus
(74) *Attorney, Agent, or Firm* — McHale & Slavin, P.A.

(57) ABSTRACT

The invention relates to a method for storing files in a data storage. The method comprises steps of providing the data storage with a plurality of data files all having the same predetermined size and a step of subsequently storing new data in the data storage by including the new data in a new data file having the predetermined size and overwriting an existing data file with the new data file.

15 Claims, 3 Drawing Sheets data storage w. data files

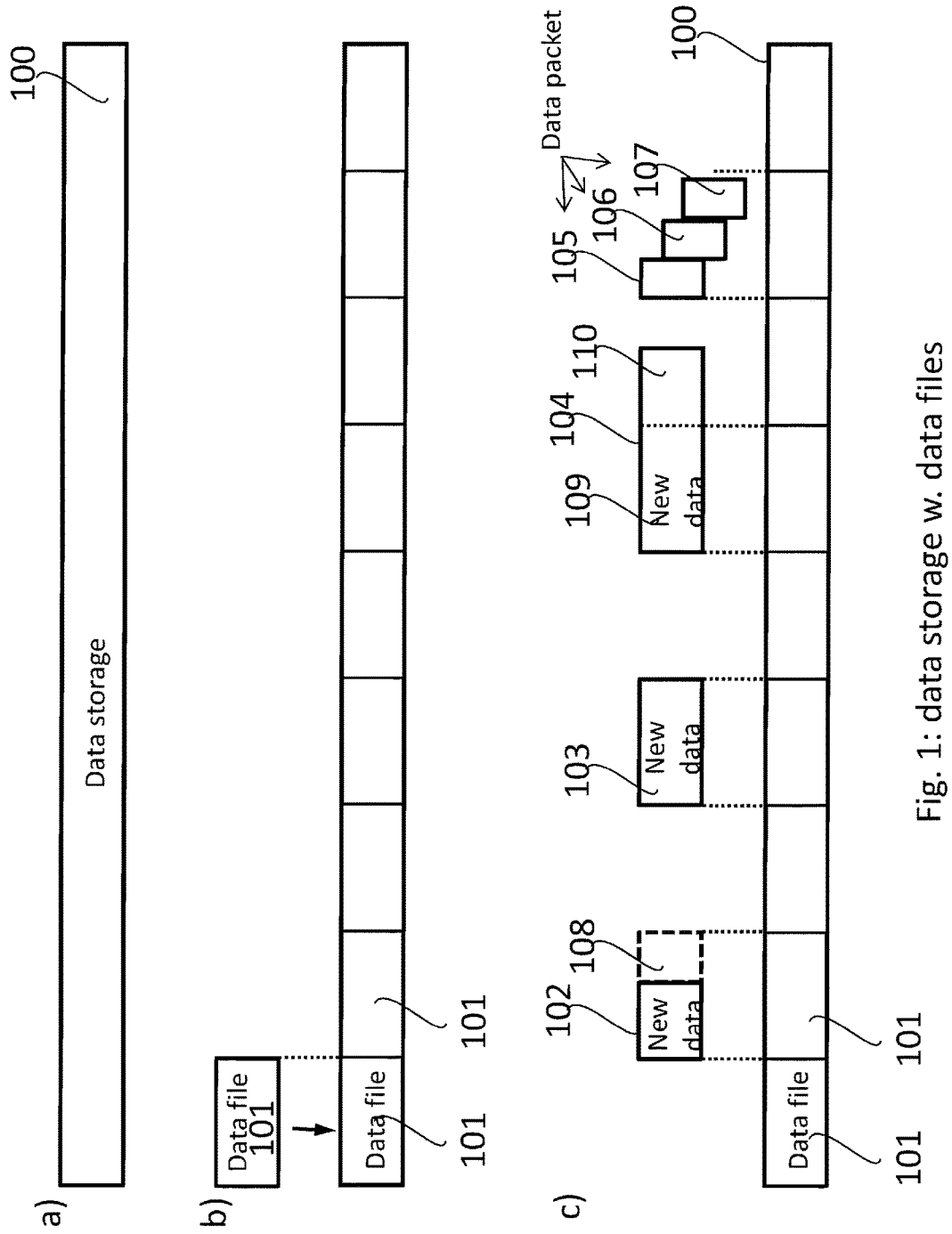
Fig. 1: data storage w. data files

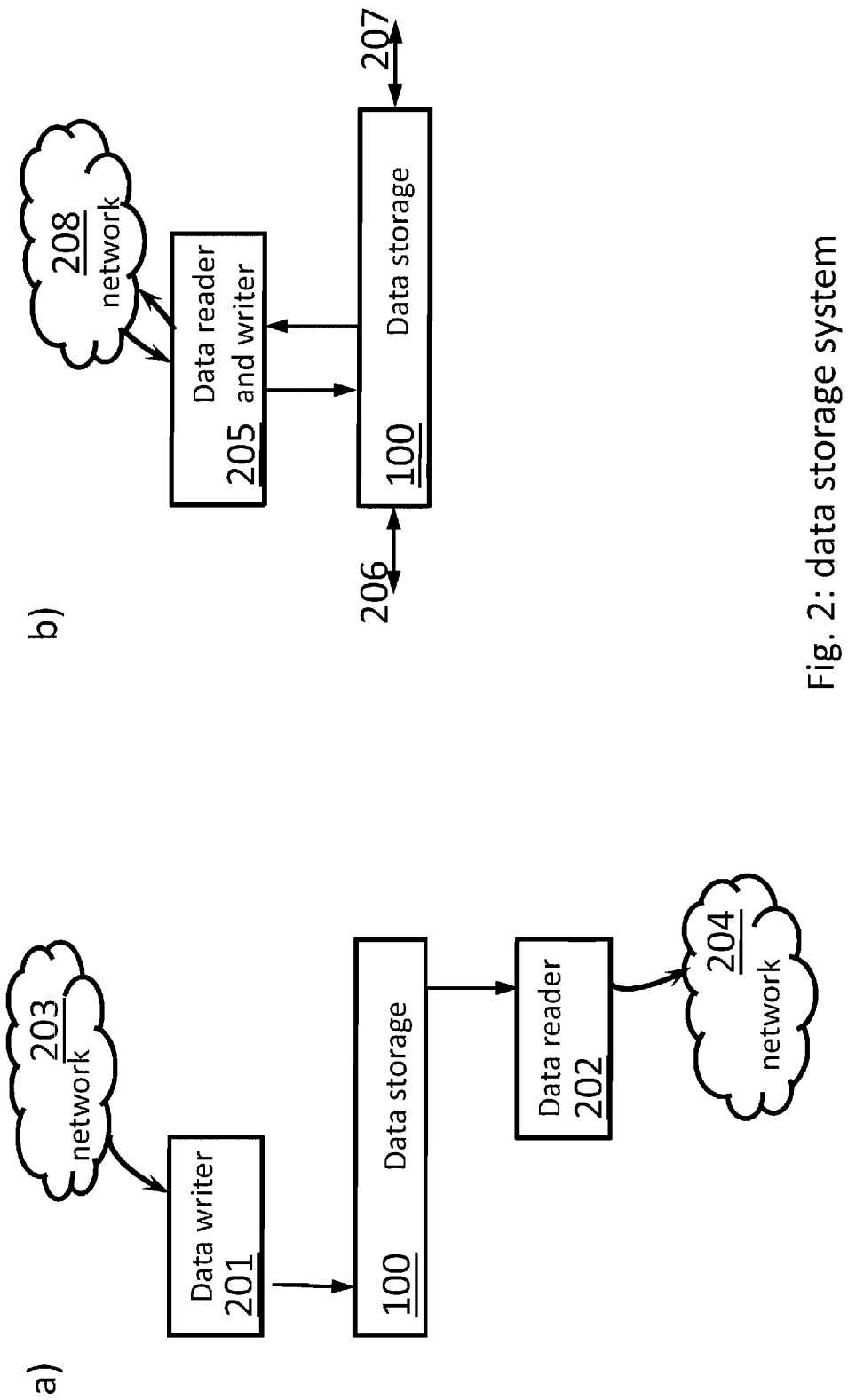
Fig. 2: data storage system a)
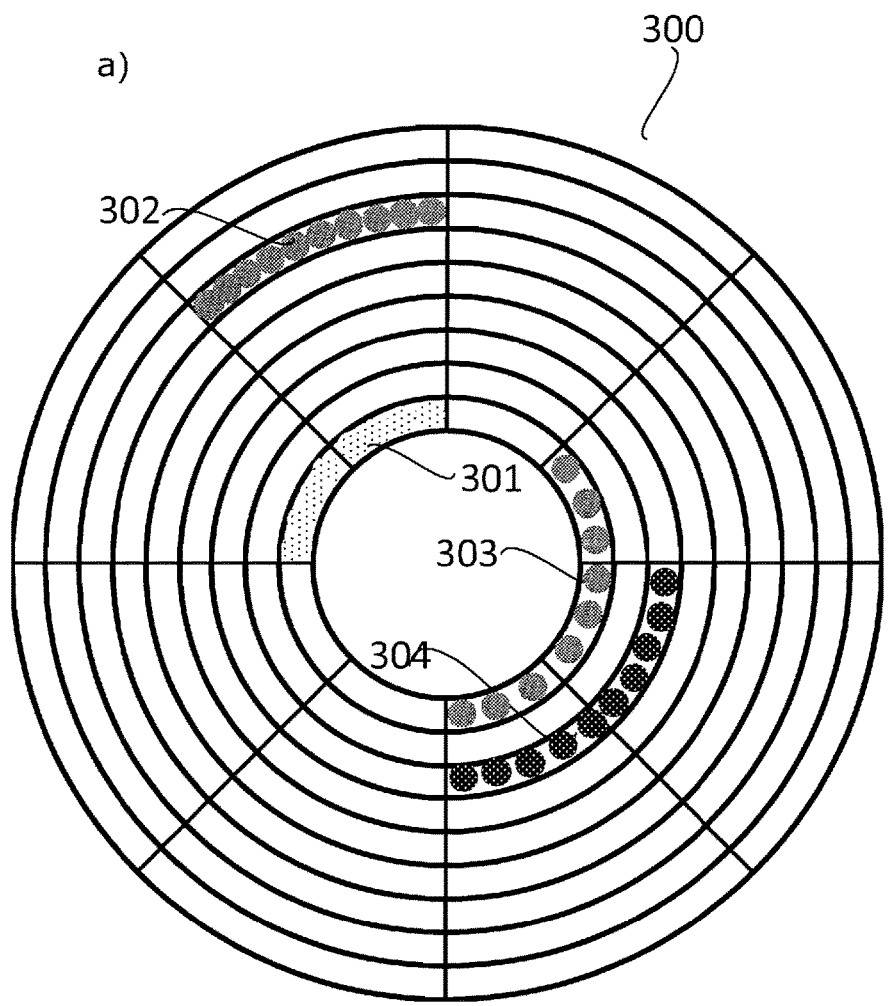
b)
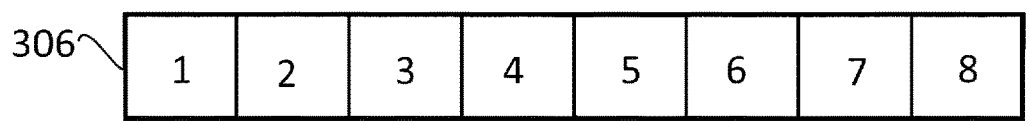
Fig. 3: reading writing process

PREVENTION OF DISC FRAGMENTATION

FIELD OF THE INVENTION

The present invention relates to a method for repeatedly storing files in a data storage without incurring disc fragmentation. Disc fragmentation tends to reduce the available space on the disc. The invention further relates to a data storage system comprising a data storage, data writer and data reader.

OBJECT OF THE INVENTION

It is an object of embodiments of the invention to prevent data fragmentation of a data storage and furthermore, to secure a deterministic read/write time from/to the data storage.

SUMMARY OF THE INVENTION

In a first aspect, the present invention relates to a method for storing data files in a data storage, the method comprising steps of
 a. providing the data storage with a plurality of data files all having the same, predetermined size; and
 b. subsequently storing new data in the data storage by including the new data in a new data file having the predetermined size and overwriting one of the plurality of data files with the new data file.

In this context, a data file may be any kind of computer information containing digitized text, photo(s), audio/video recording(s), or a combination of these. Data formats may be text files, binary files, index files, indexed files, data bases, CSV files, XLS files, XML formats, such as HTML or SVG files. The files may be stored in a data storage and retrieved again. The files may conform to a standard or protocol defining which type of information may be stored in the data file or how such data is represented.

A data storage is provided for storing the plurality of files. The data storage may be a single storage or a plurality of storing elements. The data storage may be any kind of an electronic memory. Many types of storages exist, such as discs, disc arrays, hard disk drive, solid-state drive, flash memory, optical disc, random-access memory (RAM) and the like. Such data storage may be configured to store information for use in a computer.

In the present context, each data file has the same predetermined size. The predetermined size of the data file may typically be larger than the largest Ethernet packet. An Ethernet packet is typically no more than 1500 bytes. Preferably, the predetermined size is larger than 1500 bytes, so that a file may hold at least one Ethernet packet. The predetermined size may be larger than 10 KB, such as larger than 20 KB, such as larger than 100 KB, such as larger than 500 KB. Further, the predetermined size may be larger than 1 MB, such as larger than 10 MB, such as larger than 20 MB, such as larger than 100 MB, such as larger than 500 MB, such as around 1 GB. The predetermined size may typically be 1024 MB.

The new data may have any size, smaller than, equal to or larger than the predetermined size. The new data file has the size which is equal to the predetermined size.

Once the new data is included in one or more new data files, one of the plurality of data files is overwritten with the individual new data file.

By overwriting an existing data file with a new data file with the same size, memory fragmentation is prevented. When all data files have the same size, any existing data file may be overwritten with the new data file. Thus, any existing data file may be selected for overwriting while retaining the advantage of avoiding fragmentation.

The providing step may comprise initially providing the plurality of data files in the data storage. These files may then be empty or comprise data of no relevance. Alternatively, the providing step may comprise storing initial new data, such as data received and to be stored, in the data files of the predetermined size and storing these in the data storage, where step b. is then initiated when the data storage has been filled with the initial data files.

In one embodiment, the new data may be a sequence of one or more data packets. A data packet may be any type of a data unit to be transmitted on or transported by a network, data cable, data bus, trunk, or the like. Normally, a data unit conforms to one or more data standards, such as the Ethernet standard being an umbrella under which a number of different standards or data packet types exist, such as UDP and TCP data packets. A data packet usually has a number of different information items or types, such as address data, payload or the like, which are each positioned at well-defined or known positions within the data packet. Such positions and types will typically differ from data packet type to data packet type, but usually, the data packet type, and thus the positions of individual contents thereof, may be determined from the actual data packet, where after the individual data items, such as address data and/or payload, may be derived, altered, and/or used in the analysis.

Typically, a sequence of more data packets may be received in an order of receipt. Once the sequence is received it may be included into a new data file which may be stored in the data storage. Storing of the sequence of packets may be performed by repeatedly including a next data packet to the new data file, until a size of the next data packet in the order exceeds a remaining space in the new data file. The entire sequence of the data packets may be included into the new data file in the order of the receipt.

Usually, a sequence of data packets may be a plurality of packets transmitted from a single transmitter to one or more receivers. The sequence of data packets may relate to e.g. a single file or the like transmitted in smaller portions, being the payload of the packets. The transmitter and receiver, or any intermediate network elements, may usually then have addresses also represented in the data packet. The sequence may be identified on the basis of e.g. the addresses and/or identifying information in the data packet. The identifying information may be a label. Data packets in a sequence may be sequentially numbered. All data packets from a transmitter to a receiver may be considered to be part of a sequence, or only data packets with particular contents, conforming to a particular protocol or having a particular label may be taken as part of a sequence.

When the total amount of data represented by the packets is lower than the predetermined size, the data packets may be included into a single data file. If the total amount exceeds the predetermined size, packets may be added until there is no room for the next package. That package may then be provided, for example with additional packets, in another new data file.

In another embodiment, the new data may have a size which is smaller than the predetermined size. In such an example, the new data may be padded by a predetermined padding data, to reach the predetermined size. Padding data may be an array of zeros or ones, or a combination thereof, depending on a coding system used.

In yet another embodiment, the new data may have a size which is larger than the predetermined size. In such an example, the new data may be divided into a number of portions wherein a maximum size of a portion may be equal to the predetermined size. Each portion may further be included into a separate data file and each new data file may be stored by overwriting an existing data file with the individual new data file. In this example, the new data is included in more than one new data file, and one new data file contains only a part of the new data. Naturally, each new data file will overwrite a separate data file.

Naturally, the step of providing one or more data packets in a new data file may comprise providing additional data to the data file, such as data describing that the data file comprises multiple data packets, or one or more portions of a data packet which has been divided up into portions and stored in multiple data files.

The method may further comprise the step of reading one or more data files from the data storage. Reading a data file may comprise removing the data file from the data storage or merely tagging the data file as read, so that it may be overwritten. This tagging need not be the addition of information to the data file. An inventory, such as a file or library, may be provided holding information relating to which files may be overwritten and which may not. This information may additionally or alternatively relate to other parameters of the files, such as when the file was stored or how old it is, in the situation where data files are overwritten in the order of storage thereof.

In some situations, the files are stored in queues determined on the basis of the data stored therein. In one example, a session to which a data packet belongs is received and the data packets stored in a number of data files. These data files may be stored in a queue, such as sequentially in the data storage, determined by an ID of the sequence, one or more addresses of the data packets or the like. In a situation of that type, data files relating to a sequence or session of data packets may be tagged for overwriting, if the session or sequence stops, times out and/or is seen as no longer interesting.

The writing step thus may comprise updating this inventory. Also, the storing step may comprise indicating in the inventory that an address is taken up and/or a file is now stored.

Naturally, the reading step may comprise re-generating data packets stored in the data file. If multiple data files are stored in one file, these may be identified and unpacked, and if multiple files comprise portions of a divided data packet, this may be determined, the portions retrieved from the individual data files and the data packet re-generated or re-assembled.

In general, but also in an embodiment of the invention, a particular reading/writing scheme may be used to have the same overall reading/writing speed over the data storage—especially when the data storage is formed by a rotating disc.

Thus, in one embodiment, the data storage is a rotating disc storage having an innermost storage position and an outermost storage position and wherein step b) comprises storing a plurality of new data files in the data storage in a manner so that the plurality of new data files are stored alternatingly at positions closer to the innermost storage position and farther from the innermost storage position.

A problem encountered in rotating discs is that the rotation speed thereof will determine the rate at which data is stored/read—but combined with the actual position on the disc at which the data is read/written. If the information or bit density is constant, for example, the same amount of information will take up a larger rotational angle, if the data is stored closer to a centre of the rotation. Thus, the closer to the centre at which the data is stored/read, the longer time will the reading/writing take. Thus, if all data is stored from e.g. an outer portion of the data storage or a portion thereof used in the method and toward an inner portion, the slower will the reading/writing rate be, as the storage is filled, as the angle required to store a given amount of data will increase with decreasing diameter or distance to the centre of the rotation.

Rotating disc storages may be hard discs/drives or the like.

A manner of ensuring that the reading/writing time is the same, on average, is to store data not from one side (outer or inner portion) but alternately at the outer and inner portions. Thus, "fast" data is stored before "slow" data is stored, and so on.

Thus, the innermost (or outermost) storage position may be an innermost (or outermost) storage position of the overall storage or of a portion thereof used for storing the present files.

One manner of obtaining this is when a number of data packets are to be stored, storing the first one in the outermost, available position and the next one in the innermost, available position. In this context, the position is available if empty or has a data file which may be overwritten.

The next data packet is then stored in the outermost, available position (next to the outermost one), and the next one in the innermost, available position (next to the innermost one). Thus, as the reading/writing times of the data packets then is: "the fastest, the slowest, the second fastest, the second slowest, . . . ", the overall reading/writing time will be averaged or at least evened out, no matter where the data is to be stored, as the previous and the next data will be stored correspondingly at the other end of the "fast/slow" spectrum.

Naturally, the reverse may be used: storing the first data packet at a centre position of the storage and then alternatingly storing the next data packets in the neighbouring positions to the faster (outer) and slower (inner) sides thereof.

In this embodiment, it may be desired to store and overwrite all data files in the order of receipt. Thus, when the centre of the data storage (or the portion thereof used for this storing) is reached, the overwriting may start at the outer addresses thereof. Then, it may be assumed that the data file(s) at a next position for storing of a new data file may be overwritten, so that the order of the filing of the files may be maintained.

Naturally, this method may also be used for storing data in multiple portions of a data storage. Again, the outermost and innermost, available storage positions (and those neighbouring thereto etc) may be defined and used in this manner.

This manner is independent of whether the data to be stored is of the same size, but naturally, the same-size data packets have the advantage that the storage is not fragmented. Naturally, it would be possible to alternatingly store data packets with varying sizes, as long as it is allowed to overwrite portions of an existing file or of multiple files.

In a second aspect the invention relates to a data storage system comprising:
  a. a data storage comprising a plurality of data files all having the same predetermined size;
  b. a data writer in connection with the data storage, the data writer configured to write new data in the data storage by including the new data in a new data file having the predetermined size and overwriting one of the plurality of data files with the new data file.

As mentioned above, the data storage may be single data storage, such as a single solid state disc, a disc array, a RAM, a flash memory or the like, or the data storage may be formed by a plurality of data storage units. Naturally, the data files need not take up a total storage capacity of the data storage. A portion of the data storage may be reserved for the data files. Preferably, only data files of the predetermined size are then stored in this portion of the data storage.

The data writer is configured to store data files in the data storage. The data writer may be formed by a controller, computer chip, processor, ASIC, FPGA, software controlled and/or hard wired and may be in communication with the data storage. The data writer may have a number of other capabilities, such as reading data files from the data storage, analysing data or data files, error checking data or data files, receiving and/or outputting data, data files or data packets if desired. The data writer may additionally be configured to determine or comprise information relating to stored data files, such as an address or position of the individual data file in the data storage and/or in which addresses or positions data files are stored and/or data files may be or may not be overwritten.

The data storage system may comprise a preloader configured to initially store the plurality of data files in the data storage. The preloader may be an electronic device which may do formatting of the data storage and partitioning of the data storage in addition to introducing a plurality of data files of the predetermined size. The initially provided data files may be empty or have unimportant information therein. Alternatively, the preloader may be formed by the data writer initially receiving initial data and storing this in data files until the data storage is filled with data files of the predetermined size.

The data writer may be an electronic device which may be connected to the data storage. The data writer may comprise a processor or controller, hard wired and/or software controlled, to write the new data files into the data storage. The data writer may be a single element or a plurality of interconnected elements. The data writer may receive the new data to be stored from a local network, and write it into the data storage.

A data storage system may further comprise a data reader, which may be in connection with the data storage. The data reader may be configured to read data files stored in the data storage. The data reader may further derive data, such as data packets, and output these, such as by transferring it/them to a network.

The data reader and writer may be a single device configured to both read and write the new data from and into the data storage. The device may be in connection with the data storage, and it may serve to both read and write a new data. The data storage may be in connection with more than one of these devices. The device may be in connection with a network which sends and receives a new data to the device. Once a new data is read from the data storage by the data reader, the data file may be empty or e.g. tagged for overwriting.

In one embodiment, the data writer is configured to receive a sequence of data packets, such as in an order of receipt. Once the sequence is received, the data writer may include, as the new data, one or more of the data packets into the new data file. If the sequence holds more data packets than can be stored in a single new data file, the data packets may be added to multiple data packets which then each is stored by overwriting a file in the data storage. This storing may, naturally, be in the order of receipt of the data packets.

Storing of the data packets of a sequence may be performed by repeatedly writing a next data packet into a new data file, until a size of the next data packet in the order exceeds a remaining space in the new data file. This file may then be stored and the last data packet added to a new data packet.

Typically, the predetermined size may be larger than 1024 MB. Furthermore, a read/write time of the new data may be constant over the entire storage.

In yet another embodiment, the new data may have a size which is smaller than the predetermined size. In such an embodiment, the data writer may add a predetermined padding data to the new data to reach the predetermined size. The predetermined padding data may be added to a portion of the new data file which is not taken up by the new data.

In yet another example, the new data may have a size which is larger than the predetermined size. In such an embodiment, the data writer may divide the new data into a number of portions, wherein a maximum size of a portion may be equal to the predetermined size. Each portion may further be written into a separate data file and stored into a new data file by overwriting an existing data file with the individual new data file.

In general, the writer may in principle overwrite any data file, but usually, the data file to overwrite is determined based on certain parameters. In one situation, the oldest data file is overwritten. In some situations, the data files are stored in queues, such as sequences of addresses or positions, and all data files of a queue may be decided to be overwriteable. This may be the situation where all packets of a sequence or session of packets are stored in data packets in a queue, where the session/sequence has been read/analysed or has ceased to exist or be interesting, where after all files of that queue may be overwritten. Overwriteable files may themselves be tagged or an inventory or other knowledge may be maintained to the effect that the files may be overwritten. This knowledge may be maintained so that if a file is overwritten, the address/position is no longer "overwrite". Naturally, this knowledge may be further enhanced to e.g. identify a sequence/session of the packets stored therein.

As indicated above, a reader may be provided which can read data files from the data storage. The reader may update knowledge relating to read (and thus overwriteable) data files and/or data files which may be overwritten for other reason, such as if the files are old or no longer relevant.

The reader may additionally retrieve data stored in the data files, such as data packets stored therein. The reader may learn that multiple data packets are stored in a file and retrieve all such files. The reader may alternatively learn that the data of a data file is a portion of a larger data file, where the reader may then read the additional data file(s) to be able to re-assemble the data packet.

BRIEF DESCRIPTION OF THE DRAWINGS

Preferred embodiments of the invention will now be described in further details with reference to the accompanying drawings, in which:

FIG. 1 illustrates a data storage comprising a plurality of data files all having the same predetermined size.

FIG. 2 illustrates a data storage system.

FIG. 3 illustrates a constant reading/writing speed from/to a data storage being as a disk.

While the invention is susceptible to various modifications and alternative forms, specific embodiments have been shown by way of example in the drawings and will be described in detail herein. It should be understood, however, that the following description relates to examples of embodiments, and the invention is not intended to be limited to the particular forms disclosed. Rather, the invention covers all modifications, equivalents, and alternatives falling within the spirit and scope of the invention as defined by the appended claims.

Furthermore, all the drawings are not to scale, and therefore any ratio extracted from the drawings is not relevant.

DETAILED DISCLOSURE OF THE INVENTION

FIG. 1a illustrates a data storage 100 provided for storing digital data.

FIG. 1b illustrates preloading of the data storage 100 with a plurality of data files 101 all having the same, predetermined size. Each of the data files 101 may comprise new data. The data storage 100 may be completely filled by the data filed or have a portion thereof which may be used for storing only new data files.

FIG. 1c illustrates subsequently storing new data 102-107 in the data storage 100.

In one example, the new data 102 has a size which is smaller than the predetermined size of the data file 101. In order to fit the new data 102 into one of the data files 101 of the data storage 100, the new data 102 may be padded by predetermined padding data 108. A sum of the size of the new data 102 and the padding data 108 will be equal to the predetermined size of the data files 101. A next step is overwriting one of the plurality of data files 101 with the new data file having the new data 102 and the padding data 108.

In general, the storing of a data file is an overwriting of an existing file. It is noted that the two files will always have the same size.

When new data 103 has exactly the predetermined size, it may simply be included into a new data file which is then stored in the data storage 100.

In some situations, the new data 104 has a size which is larger than the predetermined size of the data file 101. In order to fit the new data 104 into the data storage 100, the new data 104 is divided into portions with a size which is equal to or smaller than the predetermined size, as illustrated in FIG. 1c.

The new data 104 is divided into two portions, 109 and 110. As the portion 110 is smaller than the predetermined size of the data file it may be padded by a padding data in the same manner as it is shown for the new data 102. The new data 104 will therefore be included into two new data files which is stored in the data storage 100 by overwriting two data files 101.

Naturally, the new data may be formed by any type of data, such as a sequence/flow/session of one or more data packets. FIG. is illustrates three data packets 105-107 received in an order of receipt. A sum of the sizes of all three received packets 105-107 does not exceed the predetermined size of the data file 101 and therefore all the three packets can be included into a new data file. If the size of the all three packets is smaller than the predetermined size, a padding data can be added as it is shown for the new data 102.

In general, the data storage may initially be filled with empty or non-relevant data packages which are thereafter overwritten. Alternatively, initial, new data files may be stored in the data until the data storage is filled, where after overwriting commences.

When the stored new data files which comprise data packets which are a part of a sequence of more data packets have to be read from the data storage, it should be clear in which order to read these new data files. Typically, a sequence of more data packets may be received in an order of receipt. Each data packet, being a part of a sequence, when included in a new data file, may contain a label which will contain information that the data packet need to be combined with the next data packet during reading. Similar to be applied for a new data which are split into at least two new data files.

The invention further relates to a data storage system illustrated in FIG. 2a. The data storage system illustrated in FIG. 2a comprises a data storage 100, a data writer 201 and a data reader 202. The data writer 201 is in connection with the data storage 100 and it is configured to write a new data into the data storage 100 by including the new data in a new data file. The data writer 201 receives new data to be stored from a network 203. The data reader 202 is also in connection with the data storage 100 and it is configured to read data from the data storage 100. The data reader 202 may further transfer the data read to a network 204. The networks 203 and 204 may be the same or two different networks.

In another embodiment illustrated in FIG. 2b, the data reader and writer 205 may be one element configured to both read and write new data from and into the data storage 100. The data storage may be in connection with more than one element like 205, as it is indicated by arrows 206 and 207. The element 205 is in connection with a network 208 which sends and receives a new data to the element 205.

The system may comprise an element or a storage wherein knowledge is maintained as to the data files, such as where the data files are stored (address/position within the storage), whether they may be overwritten, and/or parameters of the data stored in the data file(s).

In one situation, data files comprising data packets of a sequence/session/flow are stored in a queue and the knowledge comprises knowledge relating to which sequence/session/flow this queue relates to. Then, if one or more packets of that sequence/session/flow are received, the resulting new data files may be filed in that queue. Also, if a queue may later be overwritten, such as if the packets have been read or the sequence/session/flow is no longer interesting, this knowledge may be updated so that the positions/addresses may subsequently be used for storing new data packets.

Then, the reader 202/205 may be able to update such knowledge when reading a data file. Also, the reader may be configured to learn, from the knowledge or from a data file, whether the data file comprises multiple data packets, so as to be able to derive these from the packet, or if the data files comprises a portion of a larger data packet, where the reader may then read the other data files and re-assemble the larger data packet.

FIG. 3a illustrates a reading/writing process to a data storage being a disk 300. An issue with a disk may be that access to different portions of the disk may not be performed with the same speed. For instance, the reading/writing speed of data may be significantly lower in a portion 301 which is closer to the centre than in a portion 302 which is further away from the centre of the disk as the rotational speed of the disk at the perimeter is larger than the rotational speed of the disk closer to the centre and as the writing data rate is the same irrespective of the position. In the drawing, three equal size files, 302, 303, 304, are stored and illustrated as dots. It is seen that the rotational angle—and thus time—required to write (or read) the file at the inner-most portion of the disc is much higher than that required at position 302.

A simple manner of obtaining, on average, the same writing (and reading) speed or rate would be to alternatingly store files closer to the outer portion and closer to the inner portion. Thus, every other data file is stored at a higher rate and every other at a lower data rate.

An example may be seen in FIG. 3b), where the data storage 306 is divided into only 8 storage positions, where position 1 is the closest to the centre of the disc and 8 is that the closest to the rim of the disc. Thus, the order in which the data files could be stored is: 1, 8, 2, 7, 3, 6, 4 and 5—or 4, 5, 3, 6, 2, 7, 1 and 8. Naturally, much more storing positions would normally be used. The storage positions could have the same size in order to cater for the situation where the files have the same size, but this is not a requirement. If position 8 is taken up by a data file and another data file is to be stored next to it, the position of this new data file may easily be calculated.

This method may be used in a single portion of a data storage or across a number of portions thereof. Thus, if multiple storage portions (each holding multiple data files) or address groups are used, again the outermost one and the inner-most one may be identified, as may the neighbours thereof. If a storage portion is taken up, the next storage position is the relevant one of the adjacent storage portion. For example, if an outer-most storage portion is completely filled, the next, outer-most storage position could be the outermost available storage position of the other storage portions. Clearly, the average storing time of two data files stored one after the other will be more averaged than the storing time of one of them, even though, the storing time of two such data packets need not be the same for all pairs of data packets.

The invention claimed is:

1. A method for storing data files in a data storage, the method comprising steps of
   a. providing the data storage with a plurality of data files all having the same, predetermined size; and
   b. subsequently storing new data in the data storage by including the new data in a new data file having the same predetermined size, said new data has a size which is smaller than the predetermined size, and overwriting one of the plurality of data files with the new data file and adding predetermined padding data to a portion of the new data file which is not taken up by the new data, wherein a sum of the size of said new data and said padding data is equal to said predetermined size of said data files, wherein overwriting one of said plurality of data files with a new data file comprising said new data and said padding data with the same size prevents fragmentation.

2. The method according to claim 1, further comprising receiving a sequence of data packets, wherein the storing step comprises including, as the new data, one or more of the data packets, in an order of receipt of the one or more data packets.

3. The method according to claim 2, wherein the storing step comprises repeatedly including, in the order, a next data packet to the new data file, until a size of the next data packet in the order exceeds a remaining space in the new data file.

4. The method according to claim 1, wherein the predetermined size is 1024 MB.

5. The method according to claim 1, wherein the new data has a size exceeding the predetermined size, wherein the storing step comprises dividing the new data into a number of portions, including each portion into a separate new data file and storing each new data file by overwriting one of the plurality of data files with the individual new data file.

6. The method according to claim 1, wherein the data storage is a rotating disc storage having an innermost storage position and an outermost storage position and wherein step b) comprises storing a plurality of new data files alternatingly at positions closer to the innermost storage position and farther from the innermost storage position.

7. A data storage system comprising:
   a hardware processor;
      a data storage comprising a plurality of data files all having a same predetermined size;
      a data writer in connection with the data storage, the data writer configured to write new data having a size which is smaller than the predetermined size in the data storage by including the new data in a new data file having the same predetermined size, add predetermined padding data to a portion of the new data file which is not taken up by the new data, wherein a sum of the size of said new data and said padding data is equal to said predetermined size of said data files, and overwrite one of the plurality of data files with the new data file having said new data and said padding data,
   wherein the data storage system comprises only files with the same predetermined size.

8. The data storage system according to claim 7, further comprising a preloader configured to initially store the plurality of data files in the data storage.

9. The data storage system according to claim 7, further comprising a data reader, the data reader being configured to read a data file in the data storage.

10. The data storage system according to claim 7, wherein the data writer is further configured to receive a sequence of data packets and including, as the new data, one or more of the data packets, in an order of receipt of the one or more data packets.

11. The data storage system according to claim 10, wherein the data writer is configured to repeatedly include, in the order of receipt, a next data packet to the new data file, until a size of the next data packet in the order exceeds a remaining space in the new data file.

12. The data storage system according to claim 7, wherein the predetermined size is 1024 MB.

13. The data storage system according to claim 7, wherein the data storage comprises only files with the predetermined size.

14. The data storage system according to claim 7, wherein the data writer is configured to add predetermined padding data to a portion of the new data file which is not taken up by the new data having a size smaller than the predetermined size.

15. The data storage system according to claim 7, wherein the data writer is configured to divide the new data, having a size exceeding the predetermined size, into a number of portions, include each portion into a separate data file and store each new data file by overwriting one of the plurality of data files with the individual new data file.

* * * * *